(12) United States Patent
Roderique (10) Patent No.: US 8,356,586 B2
(45) Date of Patent: Jan. 22, 2013

(54) METHOD AND APPARATUS FOR CONTROLLING A COMPOUND BEARING ASSEMBLY OF A CENTRIFUGAL COMPRESSOR

(75) Inventor: Glennon J. Roderique, Overland Park, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 794 days.

(21) Appl. No.: 12/363,700

(22) Filed: Jan. 30, 2009

(65) Prior Publication Data

US 2010/0192927 A1 Aug. 5, 2010

Related U.S. Application Data (60) Provisional application No. 61/724,774, filed on Jan. 30, 2008.

(51) Int. Cl.
*F02B 33/00* (2006.01)
(52) U.S. Cl. .................. 123/559.1; 384/461; 184/6.12; 184/11.1; 415/199.1
(58) Field of Classification Search ............... 123/559.1, 123/565; 384/461; 184/6.12, 11.1
See application file for complete search history.

(56) References Cited

U.S. PATENT DOCUMENTS

| 596,310 | A | | 12/1897 | Thames |
| 862,679 | A | | 8/1907 | Thames |
| 1,433,014 | A | | 10/1922 | Kennedy |
| 1,506,856 | A | | 9/1924 | McCluskey |
| 1,539,702 | A | | 5/1925 | Szuba |
| 2,822,225 | A | | 2/1958 | Teutel |
| 3,597,029 | A | * | 8/1971 | Marcum ................ 384/461 |
| 3,737,202 | A | | 6/1973 | Rosales |
| 4,378,194 | A | * | 3/1983 | Bandukwalla .............. 415/49 |
| 5,138,477 | A | | 8/1992 | Omura |
| 5,224,459 | A | * | 7/1993 | Middlebrook .......... 123/559.1 |
| 5,887,576 | A | * | 3/1999 | Wheeler et al. ......... 123/559.1 |
| 5,895,204 | A | * | 4/1999 | Sishtla et al. ............ 415/148 |
| 5,899,661 | A | * | 5/1999 | Sishtla et al. ............ 415/150 |
| 6,478,469 | B1 | * | 11/2002 | Jones ....................... 384/461 |
| 6,516,788 | B1 | | 2/2003 | Roderique ............. 123/559.1 |
| 6,651,633 | B1 | * | 11/2003 | Jones ..................... 123/559.1 |
| 7,299,792 | B1 | * | 11/2007 | Jones et al. ............ 123/559.1 |
| 7,654,251 | B2 | * | 2/2010 | Jones et al. ............ 123/559.1 |
| 2003/0059296 | A1 | * | 3/2003 | Sishtla ..................... 415/150 |
| 2010/0084872 | A1 | * | 4/2010 | Winiasz ..................... 290/55 |

* cited by examiner

*Primary Examiner* — Steven Loke
*Assistant Examiner* — David Goodwin
(74) *Attorney, Agent, or Firm* — Intellectual Property Center, LLC; Arthur Shaffer (57) ABSTRACT

The present invention provides an apparatus and method for rotationally controlling a bearing assembly using a geared coupling system in combination with a supercharger including an input shaft. Generally, the geared coupling system includes a bearing assembly rotatably supporting a high speed shaft associated with an impeller, the bearing assembly including at least one inner bearing and at least one outer bearing; a drive gear associated with the input shaft and including a plurality of engaging members; and a geared coupler extending from a towards a plurality of engaging members adapted for engagement with the low speed gear, the geared coupler presenting an inner surface for receiving said inner bearing and an outer surface for receiving said outer bearing.

10 Claims, 6 Drawing Sheets

METHOD AND APPARATUS FOR CONTROLLING A COMPOUND BEARING ASSEMBLY OF A CENTRIFUGAL COMPRESSOR

CROSS-REFERENCE TO RELATED APPLICATION

This application claims the benefit of the prior filed U.S. provisional application No. 61/724,774 filed Jan. 30, 2008 which is incorporated herein by reference.

FIELD OF THE INVENTION

This invention relates to a centrifugal compressor or compressor with a compound bearing assembly having plural geared teeth adapted for engagement by a low speed drive gear. More specifically, the invention provides an apparatus and method for controlling the rotation of the compound bearing through an intermediate component associated with the compound bearing.

BACKGROUND OF THE INVENTION

Centrifugal compressors operate by rotating an impeller to increase the velocity of a fluid. The impeller often rotates at extremely high speeds, sometimes achieving 80,000 revolutions per minute. It is thus desirable to limit the "play" of the impeller by providing support to the impeller shaft while also providing friction reduction. This has been achieved by using ball bearing assemblies encompassing the high speed impeller shaft.

Ball bearings fixed relative to a non-rotational casing are commonly used to support other rotational bodies, such as the high speed shaft. In operation, a centrifugal compressor can accelerate to extremely high revolutions per minute very quickly, sometimes under a second. Under these conditions, ball bearings and other rotational assemblies must be built to withstand high frictional forces, heat, and vibration. Those skilled in the art will know to utilize specially fabricated ball bearings and casings of high accuracy, high strength, and heat resistant materials.

Additionally, current centrifugal compressors do not provide for "pre-spin" of the ball bearing assemblies, most notably because the bearing assemblies are fixed relative to non-rotational bodies. Bearing assemblies are forced from a stationary position to spinning at high revolutions quickly.

Additionally, high frictional forces, heat, and vibration lead to premature failure of parts/structures.

By reducing the relative speeds, frictional forces, heat, and vibration, parts constructed using more conventional materials and methods could be interchanged for the specialty parts, thus reducing costs. Additionally, reducing relative speeds, high frictional forces, heat, and vibration also lengthens the longevity of rotational bodies. By introducing a secondary rotational body fixed relative to the non-rotational casing, the outside race of the inside bearing is rotated at a velocity proportional to the drive gear.

SUMMARY OF THE INVENTION

In accordance with the objects evident from the description herein, the present invention concerns a geared coupler associated with a compressor that generally includes a case, a rotatable impeller operable to compress a fluid within the case when rotated, a shaft fixed relative to the impeller, a bearing assembly rotatably supporting the shaft associated with a single bearing rotatably supporting a geared coupler. The bearing assembly is associated with the geared coupler. The object of the present invention is to provide additional speed and friction off-loading by providing a secondary rotational mass to reduce the speed and alleviate frictional stress isolated to one rotational body. The intended effect of off-loading rotational speed and friction serves to prolong the life of the ball bearings, and thus the centrifugal compressor as a whole.

The geared coupler assembly includes a geared coupler having a series of engaging members adapted for engagement by a low speed drive gear and a plurality of bearings supporting a high speed shaft. One set of bearings is associated with the inside race of the geared coupler and the outer race of the shaft, and one bearing associated with the outer race of the geared coupler and the inside race of the case. The geared coupler assembly is positioned such that the inner bearings allow the high speed shaft to operate independently from the geared coupler assembly while the geared coupler assembly is drivably associated with the low speed shaft.

The inner race of the outer bearing is fixed relative to the outer race of the geared coupler. The outer race of the outer bearing is fixed relative to the case socket or bearing bore in the case. The outer race of the inner bearing is fixed relative to the inner race of the geared coupler. The inner race of the inner bearing is fixed relative to the high speed shaft.

An embodiment of the present invention includes a geared coupling system in combination with a centrifugal compressor associated with a vehicle, the centrifugal compressor providing boost air for the vehicle and including an input shaft. The geared coupling system includes a bearing assembly rotatably supporting a high speed shaft associated with an impeller (said bearing assembly including at least one inner bearing and at least one outer bearing), a drive gear associated with the input shaft and having a plurality of engaging members, and a geared coupler extending from a proximate end to a distal end associated with a plurality of engaging members adapted for engagement with said low speed gear. It presents an inner surface for receiving said inner bearing and an outer surface for receiving said outer bearing.

A method of practicing the present invention includes rotatably supporting an impeller shaft of a centrifugal compressor in a case, using the steps of (a) providing a geared coupler assembly including a geared coupler and a bearing assembly having an inner and an outer bearing, said outer bearing having a diameter greater than said geared coupler, said inner bearing having a diameter less than said geared coupler wherein said inner bearing is fixed within said geared couple and said outer bearing is fixed onto said geared coupler; (b) fixing a case bearing relative to the case along a rotational axis associated with the impeller shaft; (c) positioning said inner bearing along said rotational axis for at least partial rotational support of the impeller shaft on the case; and (d) engaging a drive gear associated with an input shaft by said geared coupler whereby said bearing assembly is rotationally maintained.

DETAILED DESCRIPTION OF THE INVENTION

I. Introduction

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
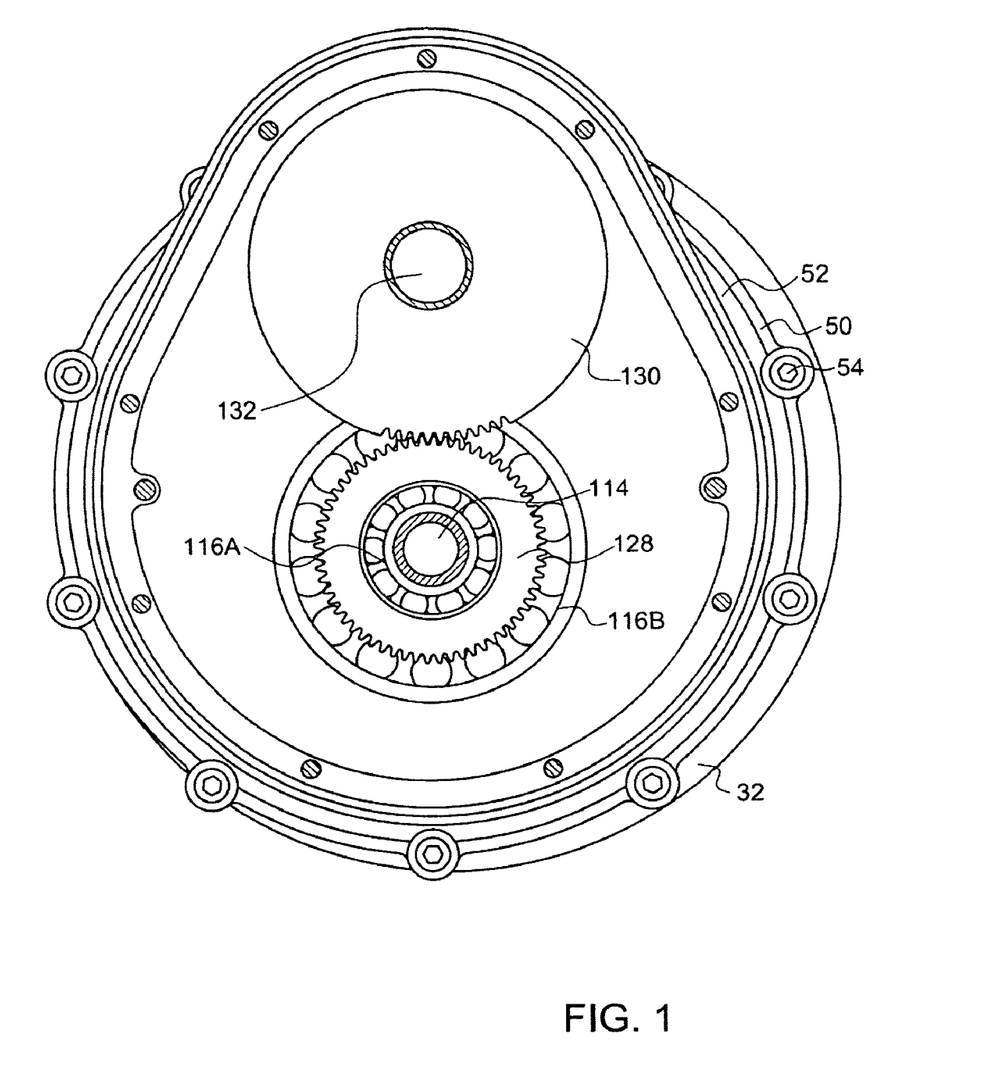
FIG. 1 is a front elevation view of a centrifugal compressor.

II. A Method and Apparatus for Controlling a Compound Bearing Assembly of a Centrifugal Compressor Referring to FIG. 1, an embodiment of the present invention, a geared coupler 128 in combination with a centrifugal compressor is generally indicated by reference numeral 20, shown encircled by a casing adapted for use with an electric motor or internal combustion engine of a powered vehicle such as, but not limited to a boat or automobile. In addition, other equipment, such as supercharges, turbine engines or centrifugal pumps operating on compressible fluids, may also benefit from the disclosed invention.

The illustrated centrifugal compressor 20 includes a case 32 that generally provides compressor and transmission chambers. The transmission chamber is preferably teardrop shaped, with the bottom being wider than the top. The case 32 presents an outwardly projecting lip 50 that extends partly around the perimeter thereof. The lip is received in a complementary groove 52 defined in the case 32 and a plurality of fastener assemblies 54 secure the case 32. Such a construction is disclosed in U.S. Pat. No. 6,651,633, registered Nov. 25, 2003, and entitled CENTRIFUGAL COMPRESSOR HAVING COMPOUND BEARING ASSEMBLY, which is incorporated by reference herein in its entirety as is necessary for a full and complete understanding of the present invention.

Figure 5:
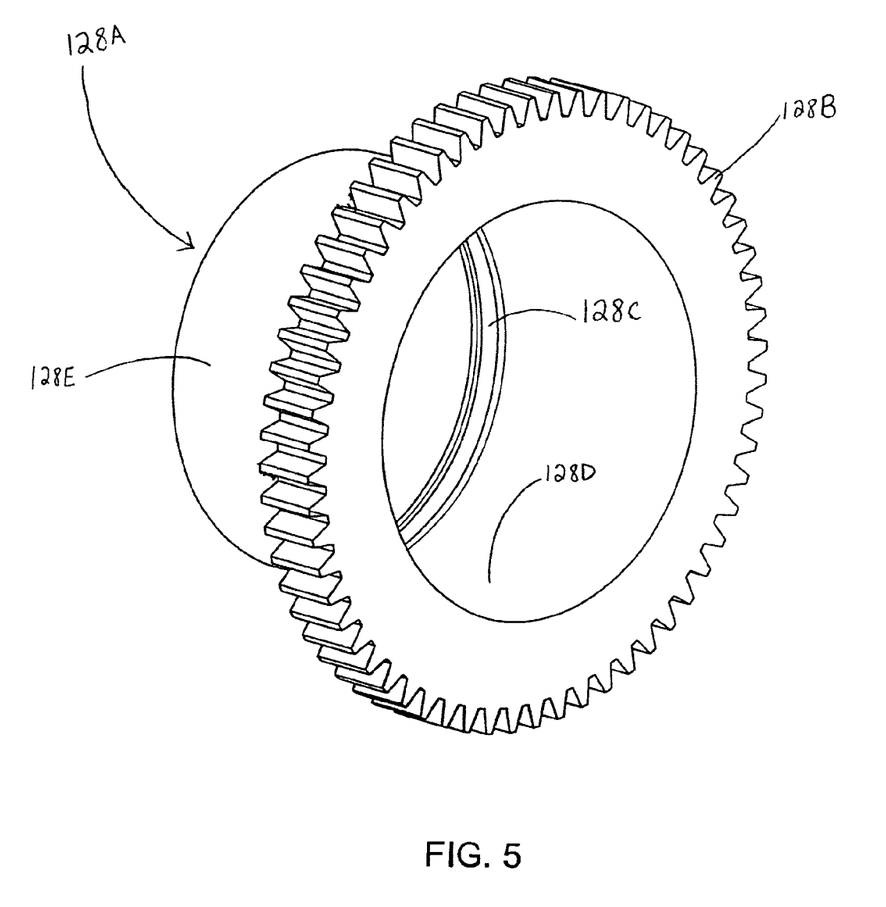
FIG. 5 is a perspective view of the geared coupler.

The geared coupler 128 is generally associated with a shaft bearing or bearing assembly 116 and a drive gear 130, preferably keyed to an input or drive shaft 132 operably connected to the engine, although these components may be fixedly interconnected in any other suitable manner. Generally, the geared coupler 128 is engaged by the drive gear 130 for rotational movement. The geared coupler 128 is illustrated as smaller than a drive gear 130, providing a step up rotation to the geared coupler 128, but may be the same or larger in diameter. As further illustrated in FIG. 5, the geared coupler 128 further includes a cylindrical housing 128a extending from a proximate end towards a distal end associated with a plurality of engaging members 128b adapted for engagement by the drive gear 130 associated with the input shaft 132. Optionally, the proximate end of the geared coupler 128 may also include an annular ring 128c. In addition, a seal assembly 152 is provided which is adapted for press fit into the case to provide a seal between the gear case and impeller shaft 114. The geared coupler 128 also presents an inner surface 128d and outer surface 128e generally adapted for receipt of the inner and outer bearings 116a, 116b. As further illustrated in FIG. 1, the internal surface 128d is generally configured for receiving the inner bearing 116a while the outer surface 128e is generally configured for receiving the outer bearing 116b. Optionally, elongated slots may be presented along the cylindrical housing 128a to assist in lubrication.

Figure 2:
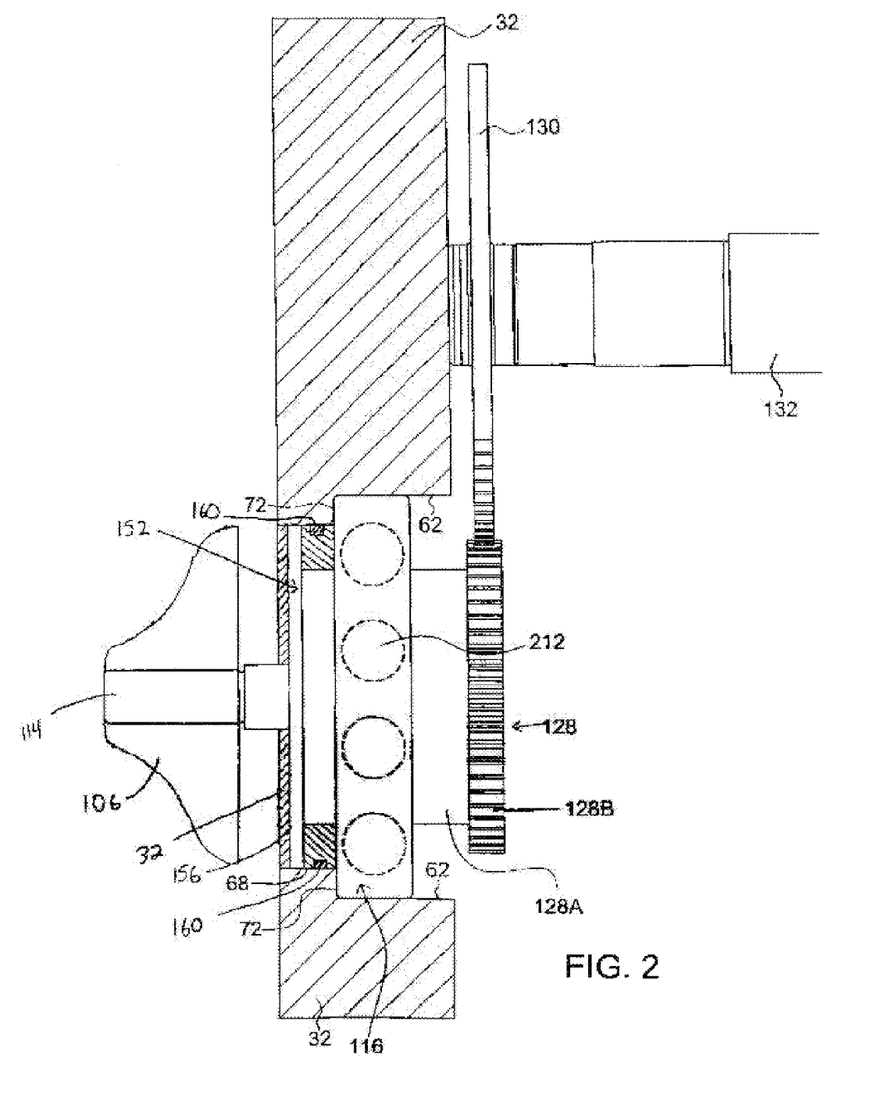
FIG. 2 is a partial side elevation view of the compressor illustrated in FIG. 1.

FIG. 2 illustrates a bearing assembly socket 72 in axial alignment with a shaft opening 62 within said case 2 along the impeller rotational axis. Generally, the bearing assembly socket 72 is adapted for receiving the bearing assembly 116 and is opposite a case bearing socket (not shown) which is adapted to receive a case bearing (not shown).

Those ordinarily skilled in the art will appreciate that an impeller 106 associated with the centrifugal compressor 20 is rotated at extremely high speeds to produce the desired output or boost. Providing durable rotational support for the impeller 106 may be problematic. Because of the high rotational velocities associated with an impeller shaft 114, various limits associated with ball bearing assemblies are commonly exceeded in conventional centrifugal compressor applications, thereby greatly increasing the risk of premature bearing fatigue and a reduced life span of the centrifugal compressor 20.

Figure 3:
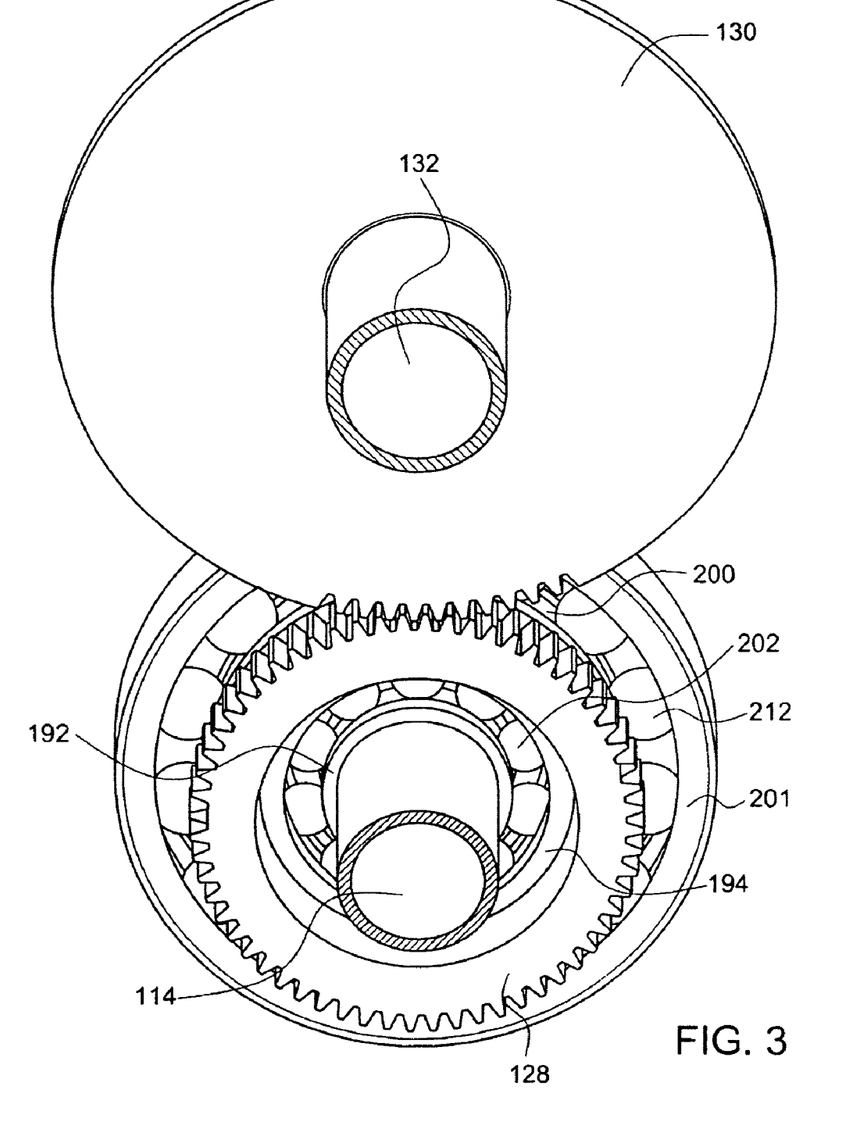
FIG. 3 is a front perspective view of a low speed gear engaging a geared coupler.

Responsive to these problems, FIG. 3 illustrates the geared couple 128 of the present invention provides initial rotational motion to the bearing assembly 116. In the illustrated embodiment, the bearing assembly 116 associated with an impeller shaft, also referred to as a high speed shaft 114 near the impeller 106, includes inner and an outer bearing 116a, 116b. The case bearing spaced a distance from the bearing assembly 116 may also be utilized by the centrifugal compressor 20 as previously described.

Figure 4:
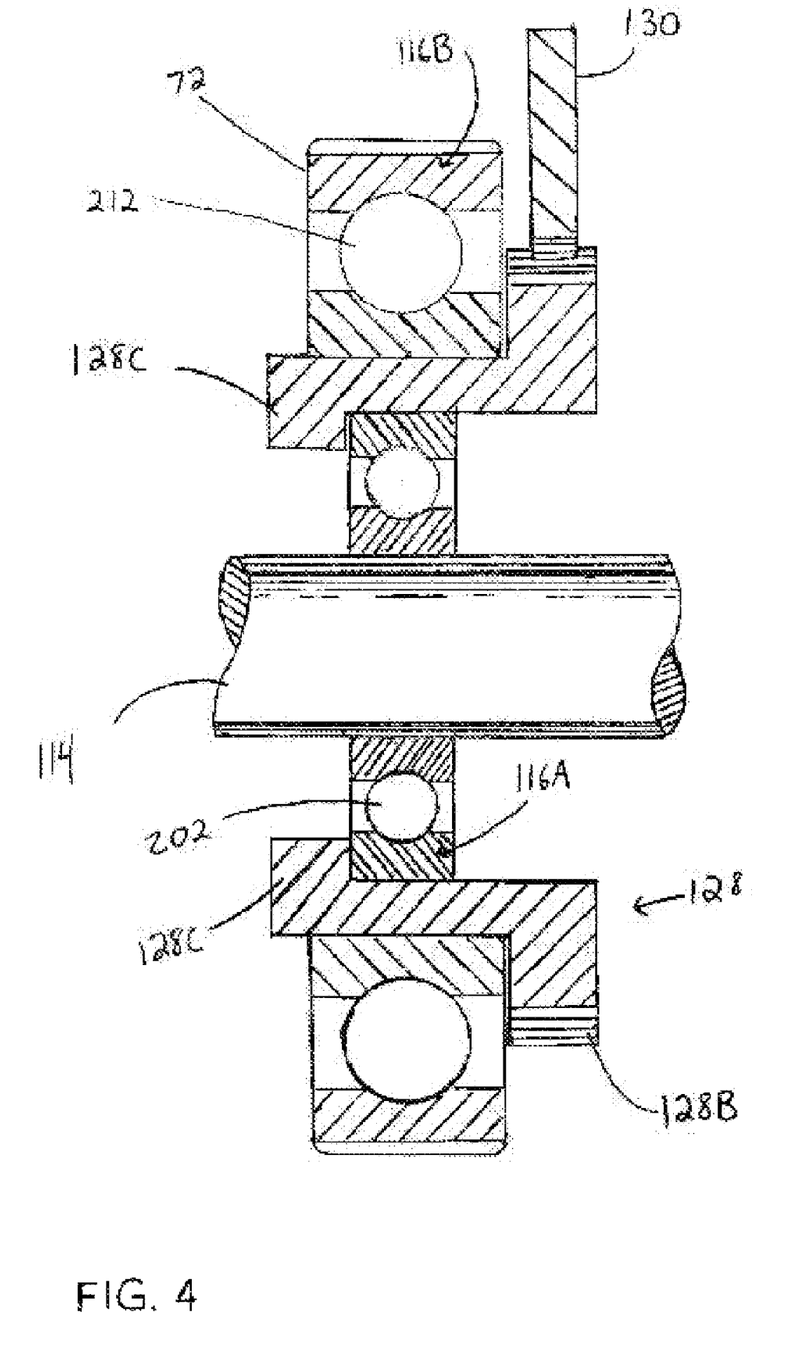
FIG. 4 is a cross-sectional view of the geared coupler associated with a bearing assembly.

Each of the inner and outer bearings 116a, 116b is illustrated in FIG. 3 as standard ball bearing assemblies, each with a plurality of balls 202, 212 circularly arranged and referred to as a ball ring. The balls 202, 212 associated with the inner and outer bearings 116a, 116b are positioned along bearing surfaces, each of which includes an inner race 192, 200 and an outer race 194, 201. Together, the case bearing and the bearing assembly 116 share the responsibility of rotatably supporting the impeller shaft 114 on the case 32. In the illustrated embodiment, the inner bearing 116a and outer bearing 116b are constructed using a press fit to the geared coupler 128, with the inner bearing 116a being positioned along the inner surface 128d of the geared coupler 128 and the outer bearing 116b is generally positioned along the outer surface 128e of the geared coupler 128, further illustrated in FIG. 4. The inner and outer bearings 116a, 116b are in communication with each other via the geared coupler 128 in such a way to reduce the velocity variance between the inner and outer bearings 116a, 116b relative to the impeller shaft 114.

Turning now to FIG. 3, the inner bearing 116a includes an inner race 196 being fixed relative to the impeller shaft 114. The inner race 196 must be dimensioned to allow the inner bearing 116a to be press fit onto the journal portion of the impeller shaft 114. In the preferred embodiment, the inner race 196 is cylindrical in shape, matching the cylindrical shape of the journal portion of the impeller shaft 114 and allowing the inner race 196 to be fixed relative to the impeller shaft 114. The inner race 196 must also be configured to allow cooperation with the other components of the bearing assembly 116 providing adequate rotational support of the impeller shaft 114. Although the preferred embodiment utilizes a press fit as the means to fix the inner race 196 relative to the impeller shaft 114, any method of sufficiently affixing the inner race 196 relative to the impeller shaft 114 could be implemented (e.g., the inner race 196 could alternatively be machined as an integral part of the impeller shaft 114).

Referring back to FIG. 2, an impeller shaft seal assembly 152 including a retaining ring 156 and a circumferential O-ring 160 sealingly engages the case 34 from the impeller 106. The seal assembly 152 or any portion thereof may be formed of any suitable material, such as steel, plastic, rubber or "TEFLON", providing a seal between the case and the impeller shaft 114. On the other hand, the input shaft seal assembly 154 may include a metal case press fit within the case 32 against the annular ring 128c associated with the geared coupler 128. The illustrated seal assembly 152 is preferred but shall be considered illustrative only and the principles of the present invention are equally applicable to a centrifugal compressor using various other types of seals.

In operation, the impeller shaft 114 is rotated at incredibly fast speeds and experiences extreme accelerations. For example, the centrifugal compressor shaft velocity at the bearing assembly 116 (measured at the outer surface of the impeller shaft 114 or the inner shaft-engaging surface of the inner bearing 116a) equals or exceeds about five thousand five hundred (5500) fpm during normal impeller operation. Furthermore, the impeller shaft 114 can be accelerated as much as 80,000 rpm, or revolutions per minute, in less than a second. It has heretofore been believed that such operating conditions exceed virtually all known bearing limitations, except in the case of extremely expensive and uniquely configured (e.g., ceramic) high speed bearings. For example, the impeller shaft 114 may operate at speeds in excess of three times the limiting speeds of standard bearings, which creates centrifugal loads that are up to ten times the acceptable loads corresponding to the limiting speeds of standard bearings. The present invention helps to bring the limiting speed of the standard bearings to within acceptable parameters with the use of the geared coupler 128.

As previously stated, the impeller shaft 114 travels up to 80,000 rotations per minute, which during acceleration is well in excess of standard bearing limitations. By comparison, the drive shaft 132 rotates at about ten times less or up to 8,000 rotations per minute. By utilizing the relatively low speed of the drive shaft 132 to rotate the drive gear 130, which in turn rotatably engages the geared coupler 128, the inner and outer bearings are rotationally maintained. In this manner, the inner and outer bearings 116a, 116b are rotated under relatively stable conditions, reducing the effects of the excessive velocity and acceleration demands caused by the acceleration of the impeller shaft 114 as the centrifugal compressor 20 operates to provide the desired boost. Generally, the inner and outer bearings 116a, 116b are intercoupled by the geared coupler 128 to the drive gear 130 in such a manner that the entire velocity variance between the impeller shaft 114 and case 32 (e.g., 350 ft./sec vs. the relatively stationary case) is reduced by the velocity of the rotational movement of the inner and outer bearings 116a, 116b. It is believed that this configuration decreases the variable velocities of the bearing assembly 116 with respect to the impeller shaft 114 within acceptable bearing limits, even though the overall velocity variance between the impeller shaft 114 and the case 32 are above operational limits of some bearing assemblies.

The inner bearing 116a further includes an outer race 198. The outer race 198 matches the shape of the inner surface 128d of the geared coupler 128 and, in the preferred embodiment, is cylindrical. In addition, the outer bearing 116b further includes an outer bearing inner race 200 which matches the shape of the outer surface 128e and an outer bearing outer race 201 complementarily configured with respect to the inner race 200 of the geared coupler 128, which, in the preferred embodiment, is cylindrical.

In the preferred embodiment, the diameter of the inner bearing 116a outer race 194 is greater than the diameter of the inner bearing 116a inner race 192 and is defined in the same radial plane relative to the impeller shaft 114. The diameter of the inner bearing 116a outer race 194 defines an interior dimension for the geared coupler 128 and an outer diameter of the impeller shaft 114. The diameter of the outer bearing inner race 200 defines an outer dimension of the geared coupler 128 and the diameter of an outer bearing outer race 201 is greater than the diameter of the outer bearing inner race 200 and defines the dimension of the socket 62 associated with said case 32 for seatable receipt of the outer bearing 116b. The case bearing (not shown) also includes an outer race which is generally fixed relative to the case 32 opposite the bearing assembly 116 along a rotational axis of the impeller 106.

The terms "inner" and "outer" as used herein to describe the preferred embodiment were selected to facilitate clarity of the description and do not necessarily describe relative radial positions. For example, it is well within the ambit of the present invention that the inner 192, 200 and outer races 194, 201 could be configured so that the inner race 192, 200 is positioned, or at least a portion thereof, radially outward (relative to the rotational axis of the impeller shaft 114) from part or all of the outer race 194, 201.

It is believed that the arrangement of the bearing assembly 116 and the case bearing in a staged bearing arrangement—i.e. the inner race 196 of the inner bearing 116a fixed relative to the impeller shaft 114, the outer race 194, 201 of the case bearing being fixed relative to the case 32 and the outer race 198 of the inner bearing 116a fixed relative to the inner surface 128d, the inner surface 200 of the outer bearing 116b being fixed relative to the outer surface 128e and the outer race 201 of the outer bearing 116b being fixed to the case 32 provides the bearing arrangement with overall synergistic benefits that either a uncoupled single bearing or bearing combination cannot provide. That is to say, it is believed that the exploitation of any one advantage in a single bearing or uncoupled combination is often limited by a similar reduction of another advantage. That is, exploiting a beneficial design characteristic in a traditional single bearing or uncoupled bearing combination typically involves sacrificing another beneficial bearing design characteristic. In the described bearing arrangement, the bearing assembly 116 is adapted for various rotational characteristics while addressing the frictional demands of the centrifugal compressor 20.

By way of example, the bearing assembly 116 may be coupled to the geared coupler 128 as previously described with the inner bearing 116a being adapted for rotation at a low velocity during low boost demands vis-à-vis the drive gear 130 while the outer bearing 116b is adapted for high velocity rotation during peak boost, thereby reducing the relative velocity of the individual bearings while achieving the necessary rotational speed. In this way, the geared coupler 128 may eliminate any stabilization issues and potential bearing skid. In addition, through the utilization of the outer bearing 116b, alternative design characteristics may be employed to take advantage of what was sacrificed in the inner bearing 116a. For example, the outer bearing 116a could be designed to maintain its stabilization point at very high rotational speeds. Accordingly, the described bearing assembly 116 could facilitate low rotational movement and high rotational movement while the bearing assembly 116 is stabilized during thrust from the low velocity rotation to the high velocity rotation. It is further believed that the geared coupler 128 also reduces the variances in the velocities of the inner bearing balls 202 and outer bearing balls 212 at the outer periphery—for example along the pitch line—relative to the velocity of the balls 202 and 212 at their centers. It is believed that reducing these variances also reduces the points of friction— or skidding—of the balls 202 and 212 relative to the races and cages, thereby increasing the overall life of the bearing assembly 116.

Figure 6:
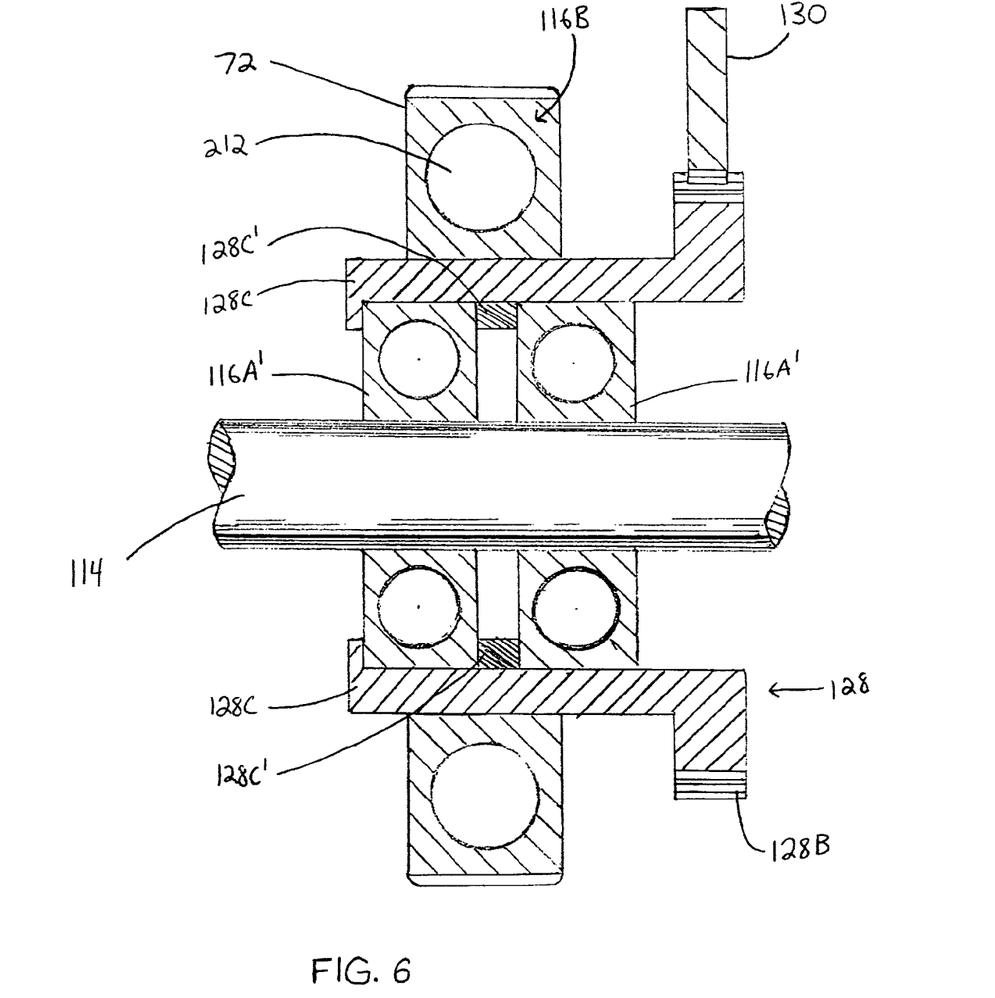
FIG. 6 is an alternative embodiment of the geared coupler associated with a compound bearing.

It is noted that the principles of the present invention are equally applicable to multiple bearing arrangements utilized to rotatably support any shaft on a stationary body and are not just limited to centrifugal compressor applications. In addition, the principles of the present invention are equally applicable to various other compressor and supercharger configurations and alternative multiple bearing arrangements, as illustrated in FIG. 6, with the compound bearing arrangement of plural inner bearings 116A 'separated by an alternative annular ring 128C'. For example, the type of bearings utilized in the described arrangement could be other types of bearings, including roller bearings (cylindrical or tapered) or needle bearings. Different types of bearings could be utilized, such as a ball bearing associated with a cylindrical bearing. Certain features of the bearings implemented in the coupled arrangement could vary. For example, the bearings could be pre-lubricated or externally lubricated bearings with the gear coupling having passageways facilitating the transmission of fluid.

It is important to note the general construction of the bearing assembly 116 and the geared coupler 128. Particularly, the inner bearing 116a is radially received within the geared coupler 128. Moreover, the inner race 192 of the inner bearing 116a is fixed on the impeller shaft 114, the outer race 201 of the outer bearing 116b is fixed to the case 32, the outer race 194 of the inner bearing 116a is fixed to the inner surface 128d of the geared coupler 128, and the inner race 200 of the outer bearing 116b is fixed to the outer surface 128e of the geared coupler 128. There geared coupler 128 provides a positive connection between the inner bearing outer race 194 and the outer bearing inner race 200. However, the inner bearing outer race 194 and the outer bearing inner race 200 are independent of the ball rings 202, 212 and the innermost and outermost races 192, 201—except the geared coupler 128 therebetween. It is now believed that the somewhat "oversized" arrangement of the bearing assembly 116 assists the case bearing, which is axially outward from the bearing assembly 116, in absorbing the accelerations of the impeller shaft 114.

Note the illustrated bearing assembly 116 includes traditional radial bearings. It has been determined that use of a radial bearing as either the shaft bearing 116 or the case bearing is permissible in a compound bearing assembly illustrated in FIG. 6, even in conditions in which the ball pitch line velocity of such radial bearing is at least about 5500 fpm during normal operation of the impeller 114. Furthermore, the bearings preferably both use steel balls 202 and 216. Such a configuration permits at least one of the bearings 116a, 116b to have a ball pitch line velocity that is equal to or greater than 8000 fpm during normal impeller operation. It is believed that the shaft bearing 116 and case bearing may alternatively be configured for grease-packed lubrication; that is, the bearing assembly is not limited to a misting lubrication type, but rather may include sealed or greased configurations within the ambit of the present invention.

The illustrated geared coupler 128 fixedly interconnecting the outer race 194 of the inner bearing 116a to the inner race 198 of the outer bearing 116b is preferably formed of a material having a equal coefficient of thermal expansion to the coefficient(s) of thermal expansion for the material(s) forming the races. Most preferably, the coupler 128 is formed of 8620 steel or any other gear quality steel and the races may be formed of similar steel (thus, the coefficient of thermal expansion for the races is the same).

Again, the illustrated embodiment permits the use of traditional bearings. For example, it has been determined that a centrifugal compressor utilizing an impeller having a diameter of six inches may utilize off-the-shelf bearings from the New Hampshire Bearing Company, wherein the shaft bearing 812 is Part No. ME1305DL, the case bearing 814 is Part No. ME1113DL, and the bearing assembly 808 is ME1203DL.

The preferred forms of the invention described above are to be used as illustration only and should not be utilized in a limiting sense in interpreting the scope of the present invention. Obvious modifications to the exemplary embodiments, as herein set forth, could be readily made by those skilled in the art without departing from the spirit of the present invention.

The inventor hereby states his intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A geared coupling system in combination with a centrifugal compressor associated with a vehicle, the centrifugal compressor providing boost air for the vehicle and including an input shaft, said geared coupling system comprising:
    a bearing assembly rotatably supporting a high speed shaft associated with an impeller,
    said bearing assembly including at least one inner bearing and at least one outer bearing;
    a drive gear associated with the input shaft and having a plurality of engaging members; and
    a geared coupler extending from a proximate end to a distal end associated with a plurality of engaging members adapted for engagement with said drive gear, and presenting an inner surface for receiving one inner bearing and an outer surface for receiving one outer bearing.

2. The combination of claim 1 wherein said geared coupler provides rotational motion to said bearing assembly.

3. The combination apparatus of claim 1 wherein said geared coupler provides a positive connection between one inner bearing and one outer bearing.

4. The combination of claim 1 further comprising a seal assembly presenting a seal between a case and the high speed shaft.

5. The combination of claim 1 wherein said geared coupler includes an annular ring associated with said proximate end and adapted for securing said inner bearing along said inner surface.

6. The combination of claim 1 wherein:
    one of said inner bearing includes an inner bearing inner race and an inner bearing outer race, said inner bearing inner race being fixed relative to said high speed shaft and said inner bearing outer race matching an inner surface associated with said geared coupler, and
    one of said outer bearings includes an outer bearing inner race and an outer bearing outer race, said outer bearing inner race matching an outer surface associated with said geared coupler and said outer bearing outer surface being received within a socket associated with a case.

7. The combination apparatus of claim 1 further comprising two inner bearings received by and spaced along said inner surface.

8. A compressor associated with a vehicle providing boost air for the vehicle and including an input shaft, said compressor comprising:
    a case;
    a rotatable impeller operable to provide boost air within the case when rotated;

a shaft that is fixed relative to the impeller and presenting a rotational axis through said case;

a geared coupler assembly including a bearing assembly and a geared coupler;

said bearing assembly including an inner bearing and an outer bearing;

a case bearing associated with the case and in combination with said bearing assembly rotatably supporting the shaft on the case;

said inner and outer bearings including moveable inner and outer races associated with a plurality of balls rotatably positioned between said races; and said geared coupler positioned along said rotational axis and rotatably engaged by a drive gear whereby said bearing assembly is rotationally maintained.

9. A method of rotatably supporting an impeller shaft of a centrifugal compressor in a case, said method comprising the steps of:

(a) providing a geared coupler assembly including a geared coupler and a bearing assembly having an inner and an outer bearing said outer bearing having a diameter greater than said geared coupler, said inner bearing having a diameter less than said geared coupler wherein said inner bearing is fixed within said geared coupler and said outer bearing is fixed onto said geared coupler;

(b) fixing a case bearing relative to the case along a rotational axis associated with the impeller shaft;

(c) positioning said inner bearing along said rotational axis for at least partial rotational support of the impeller shaft on the case; and (d) engaging a drive gear associated with an input shaft by said geared coupler whereby said bearing assembly is rotationally maintained.

10. The method of rotatably supporting an impeller of a centrifugal compressor as claimed in claim 8 wherein said inner bearing is press fit within said geared coupler and said outer bearings is press-fit onto said geared coupler.

\* \* \* \* \*